C. ELLIS.
PROCESS OF PRODUCING CEMENT AND POTASSIUM COMPOUNDS.
APPLICATION FILED JAN. 19, 1916.
1,250,291.
Patented Dec. 18, 1917.
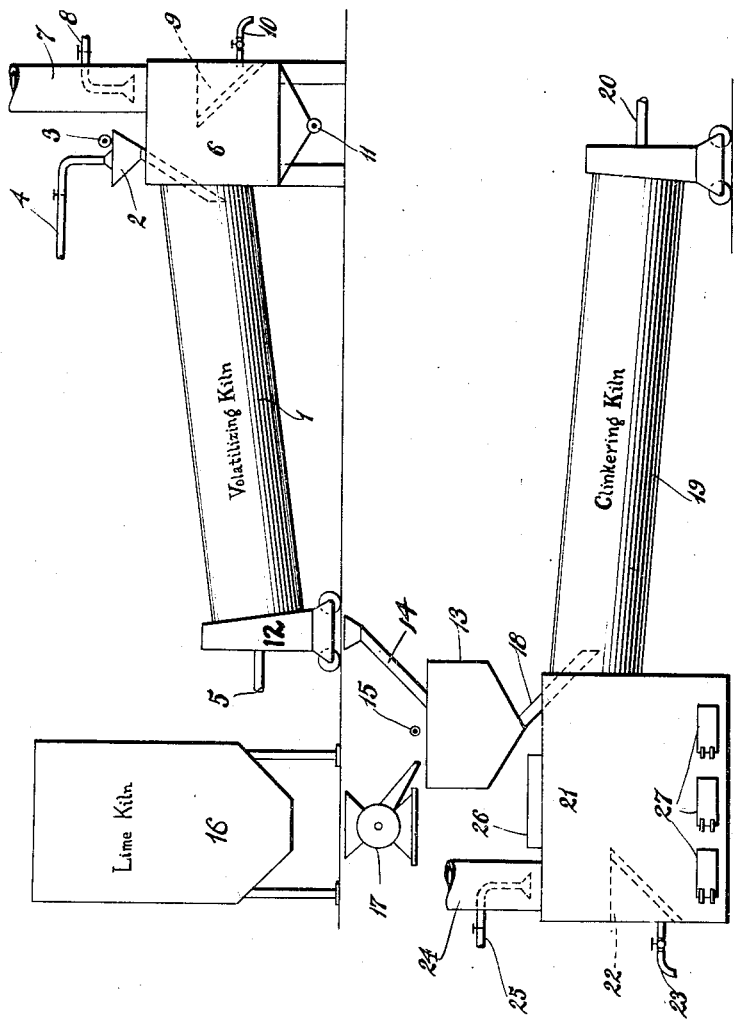
Inventor
Carleton Ellis
By A. B. Foster
Attorney
Witness
H. T. Harwood

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF PRODUCING CEMENT AND POTASSIUM COMPOUNDS.

1,250,291.      Specification of Letters Patent.      Patented Dec. 18, 1917.

Original application filed June 13, 1911, Serial No. 633,926. Divided and this application filed January 19, 1916. Serial No. 72,026.

*To all whom it may concern:*

Be it known that I, CARLETON ELLIS, a citizen of the United States, residing at Montclair, in the county of Essex and State of New Jersey, have invented certain new and useful Improvements in Processes of Producing Cement and Potassium Compounds, of which the following is a specification.

This invention relates to processes of producing potassium salts and cementitious material, in particular potassium chlorid and white Portland cement, and involves the heat treatment of cement-forming mixtures containing potassium whereby the latter is expelled as a volatile or heat-volatilized body and the residual material utilized as cement, all as more fully hereinafter described and claimed.

The present invention relates to the production of cement and potassium salts from materials including (*a*) a calcareous material such as lime, limestone or dolomitic lime or limestone, slaked lime, marble, marl, magnesia, waste lime sludges; *e. g.* from water purification, causticizing alkalis, sugar manufacture, borax manufacture, (*b*) a potassium-bearing silicate rock, *e. g.* algerite, hauynite, kaliophilite, microsommite, nephelite, leucite, anorthoclase, hyalophane, microcline, orthoclase, biotite, lepidomelane, lepidolite, muscovite, phlogopite, potassium bearing clays, or zeolites, and has special reference to the treatment of such of those materials as do not contain excessive amounts of iron (if white cement is desired), and particularly to those silicate rocks which contain large amounts of potassium.

In the preferred form of my invention, I produce an intimate mixture of a haloid of an alkali earth metal, *e. g.* calcium chlorid, with one or more of the silicate rocks above mentioned, which may be accomplished by spraying or showering the rock with a relatively concentrated solution of said chlorid. (In place of $CaCl_2$ I may use other salts having a similar action, *e. g.* $MgCl_2$, $ZnCl_2$, $BaCl_2$, fluorspar or cryolite.)

These materials are then heated, preferably while being passed through a rotary kiln, against a current of gases (*e. g.* products of combustion of the oil, gas or coal used to heat said kiln) to a temperature sufficient to produce the reaction, a temperature corresponding to a dull red heat being suitable, and the heating being preferably rather slow. The kiln should preferably be inclined so as to move the material rather slowly therethrough, as the volatilization of the potassium salt requires considerable time.

After this heating operation has driven off the larger part of the potassium present in the form of potassium salts, the lime (or equivalent) is added, and the mixture thereafter heated to a clinkering temperature.

Upon the proportioning of the materials will depend the properties of the cement product. I prefer to proportion the materials so as to produce a cement containing 63% of lime, 23% of silica, 8% of alumina, 4% of iron oxid and about 4% of magnesia, if the color is not an essential consideration. If I desire a white cement, I keep the iron below about 1% in the entering charge, a portion of this iron being removed during the process, as set forth in my copending application 633,926, filed June 19, 1911, of which the present case is a division.

The lime or its equivalent, and the silicate rock will preferably both be finely ground, say so that 90% of each will pass a 200 mesh screen.

The accompanying drawing shows a diagrammatic view of an apparatus suitable for carrying out the process of my present invention, the view being a sectional side elevation.

In said drawing 1 shows a volatilizing kiln, into which the material, *e. g.* feldspar, or the like as above indicated, is introduced through the hopper 2, *e. g.* by means of screw 3, and in this hopper the material is preferably sprinkled with calcium chlorid solution from the pipe 4, terminating in a nozzle as shown. The material, while being passed through the kiln 1, is heated, *e. g.* by means of a flame of gas, oil or coal, introduced through the burner pipe 5. The hopper end of the rotary kiln is inclosed in a housing 6, connected with a stack 7, said stack being provided at a suitable point with an inlet pipe 8, through which water or other suitable liquid may be introduced to the gases for condensing the vaporized chlorid. In the housing 6 is preferably located an evaporating pan 9, provided with an outlet pipe 10, and the lower proportion of the housing may be provided with a suitable outlet or conveyer 11, for carrying away solid material from said housing. The lower end of the kiln is surrounded by a housing 12, to prevent entrance of undesirable quantities of outside air, and the material from the housing 12, being the calcined product, enters the hopper 13, by spout 14. At 15 is shown a conveyer for bringing in additional material to be mixed with the calcined product.

At 16 is shown any approved type of lime kiln, the material from which can be ground in the mill 17, and introduced into the hopper 13, along with the product from kiln 1. This material then passes through the spout 18 into the clinkering kiln 19, where it is heated to a clinkering temperature, e. g. by means of the burner 20, in the manner well known in the art. The gas and vapors from the kiln 19 enter the housing 21, which likewise may be provided with an evaporating pan 22 having an outlet pipe 23, and also connected with a stack 24, provided with a spray pipe 25, in order to cause the separation of any potassium salts liberated in the clinkering kiln. Upon the housing 21 may be placed an evaporating pan 26, and this housing may be provided with clean-out doors 27 in the usual manner.

As the material, consisting of the silicate rock and calcium chlorid, is passed through the calcining kiln, it is heated rather slowly, while being agitated, while being gradually moved toward the lower end of the kiln, to a dull red heat, and the volatilization of the chlorid is materially aided by the current of hot gases traveling upwardly through said kiln, in a direction contrary to the flow of the solid material.

After being mixed with the lime (or equivalent material) from the mill 17, the mass is heated to a clinkering temperature, in the kiln 19, to produce Portland cement.

In the first heating step, i. e., the volatilization, the temperature hinges on a number of conditions among which the more important are (1) the fineness of the silicate and lime, (2) the amount of calcium chlorid or equivalent material present, (3) the manner in which the calcium chlorid is distributed over the material, (4) the nature of the preheating period, in which the calcium chlorid and silicate react more or less with the formation of potassium chlorid, (5) the nature of the volatilizing period, (6) the thickness of the layer exposed to heat action, (7) the degree of agitation of the material, (8) the length and temperature of the flame at given points, (9) the rate of travel of the gaseous current, (10) the action of carbon dioxid, when present during the volatilization of the potassium chlorid, and (11) the general composition and physical character of the raw mixture, and probably other conditions.

While I have described one specific example only of the process, I wish to note that the process is of quite general application, and that various equivalents, as above noted, may be substituted, and that the character of the cement product, and the character and amount of potassium product may be varied depending upon the details of the particular process, and upon the materials used. The claims accordingly are drawn to include more or less variation from the specific example given.

What I claim is:

1. The herein described process of making soluble potassium salts and Portland cement which comprises (a) spraying a finely ground potassium bearing silicate rock in the substantial absence of lime, with a solution of haloid salt of an alkaline earth metal, the latter being present in amount sufficient to furnish halogen equivalent to substantially the entire amount of potassium present in said rock, (b) slowly heating the mixture sufficiently to volatilize at least the major portion of the potassium present, while passing the agitated solid material against a counter current of flame and hot products of combustion, (c) combining the unvolatilized product of this operation with calcareous cement-making material in substantially the proportions to form a Portland cement raw mix, (d) heating the mixture sufficiently to form Portland cement clinker, and (e) separately collecting the cementitious product and the evolved potassium compounds.

2. A process which comprises heating sufficiently to volatilize at least the major portion of the potassium present, as potassium chlorid, a mixture consisting essentially of a potassium-bearing silicate and calcium chlorid, while maintaining said mixture in a moving current of heated gases.

3. A process which comprises heating sufficiently to volatilize the bulk of the potassium present as chlorid, a mixture consisting essentially of a potassium-bearing silicate rock and a haloid less volatile than potassium chlorid.

4. The herein described process of making soluble potassium salts and cement which comprises (a) intimately mixing finely ground silicate rock containing potassium with a haloid salt or an alkali earth metal, the latter being present in sufficient amount to furnish halogen equivalent to substantially the entire amount of potassium present in said rock, said mixture being substantially free from oxids and carbonates of alkali earth metals, (b) heating the mixture sufficiently to volatilize at least the major portion of the potassium present, (c) combining the unvolatilized product of this operation with calcareous cement-making material in substantially the proportions to form a Portland cement raw mix, and (d) heating the mixture sufficiently to form Portland cement clinker.

5. The herein described process of making soluble potassium salts and Portland cement which comprises (a) intimately mixing finely ground silicate rock containing potassium with a salt of an acid radical which is capable, when united to potassium, of producing a relatively volatile, water-soluble salt, said added salt being in amount sufficient to furnish an amount of the acid radical corresponding at least to the amount of potassium present in said rock, said mixture being free from material amounts of CaO and $CaCO_3$, (b) heating the mixture sufficiently to volatilize at least the major portion of the potassium present, (c) combining the unvolatilized product of this operation with calcareous cement-making material in substantially the proportions to form a Portland cement raw mix, and (d) heating sufficiently to form Portland cement clinker.

6. The herein described process of making soluble potassium salts and white Portland cement, which comprises (a) intimately mixing finely ground silicate rock, containing a small amount of iron, with a salt containing an acid radical which when united to potassium forms a readily volatile potassium salt, said added salt containing an amount of the acid radical substantially equivalent to the amount of potassium in said rock, (b) heating the mixture of said two ingredients, without material amounts of CaO and $CaCO_3$, sufficiently to volatilize at least the major portion of the potassium and a material portion of the iron present, (c) combining the non-volatile product of such operation with a calcareous cement-making material substantially free from iron compounds and other discoloring agents in proportions suitable to form a white Portland cement raw mix, and (d) heating the mass sufficiently to produce white Portland cement clinker.

7. In the production of cement, the improvement which comprises heating an alkali-bearing silicate with a material capable of aiding the volatilization of alkali metal contained therein, and without CaO or $CaCO_3$, and thereafter heating the product of said step, together with calcareous material in proportions to form a Portland cement raw mixture, to a clinkering temperature.

8. A cement-making process which comprises the step of liberating and volatilizing at least a portion of the alkali metal content of an alkali-bearing silicate, by heating said rock with a non-volatile chlorid, without lime, and thereafter adding a calcareous material, to the residue, and clinkering the mixture.

9. The process comprising a step of heating a mixture of two things only, namely a potassium-bearing silicate and a haloid having a volatilizing point materially above that of KCl, to a temperature sufficient to volatilize at least a part of the potassium content of said silicate.

CARLETON ELLIS.